US012385298B2

(12) United States Patent
Peynot et al.

(10) Patent No.: US 12,385,298 B2
(45) **Date of Patent: *Aug. 12, 2025**

(54) VEHICLE DOOR HANDLE ASSEMBLY

(71) Applicant: U-shin Italia S.p.A, Pianezza (IT)

(72) Inventors: Thomas Peynot, Pianezza (IT); Simone Ilardo, Pianezza (IT); Anthony Guerin, Pianezza (IT); Frédéric Citron, Pianezza (IT)

(73) Assignee: U-shin Italia S.p.A, Pianezza (IT)

(*) Notice: Subject to any disclaimer, the term of this patent is extended or adjusted under 35 U.S.C. 154(b) by 136 days.

This patent is subject to a terminal disclaimer.

(21) Appl. No.: 18/173,220

(22) Filed: Feb. 23, 2023

(65) Prior Publication Data

US 2023/0265692 A1 Aug. 24, 2023

(30) Foreign Application Priority Data

Feb. 23, 2022 (EP) .................................... 22158287

(51) Int. Cl.
*E05B 85/10* (2014.01)
*E05B 85/16* (2014.01)

(52) U.S. Cl.
CPC ............ *E05B 85/107* (2013.01); *E05B 85/16* (2013.01)

(58) Field of Classification Search
CPC ...... E05B 85/10; E05B 85/103; E05B 85/107; E05B 85/16; E05B 17/0041; E05B 77/42; E05B 5/00; E05B 5/03; E05B 5/006
See application file for complete search history.

(56) References Cited

U.S. PATENT DOCUMENTS 10,435,924 B1 * 10/2019 Salter ...................... E05B 81/78
10,435,926 B2 * 10/2019 Brown ................. E05B 85/103
(Continued)

FOREIGN PATENT DOCUMENTS

KR 102104888 * 4/2020

*Primary Examiner* — Christine M Mills
*Assistant Examiner* — Yahya Sidky
(74) *Attorney, Agent, or Firm* — Oblon, McClelland, Maier & Neustadt, L.L.P.

(57) ABSTRACT

The present invention relates to a vehicle door handle assembly (1) comprising a handle (2) comprising a first extremity (22) and a second extremity (23) opposed to the first extremity (22), the first extremity (22) being connected to a first lever (3) connected to an opening lever, said first lever (3) rotating between a rest position where the first extremity (22) is in a rest position, a deployed position where the first extremity (22) is in a deployed position outside the bracket (10) and an opening position where the first lever (3) actuates the opening lever, the second extremity (23) being connected to a second lever (4) rotating between a rest position where the second extremity (23) is a rest position, an activation position where the second extremity (23) is pushed into the bracket (10), and a deployed position where the second extremity (23) is in a deployed position outside the bracket (10), the vehicle door handle assembly (1) also comprising a return lever (5) connected to the second lever (4), said return lever (5) rotating between a first position and a second position, the return lever (5) comprising an elastic mean (56) passively bringing back said return lever (5) to its first position, the rotation of the second lever (4) to its activation position actuates the rotation of the return lever (5) from its first to its second position, and the passive rotation of the return lever (5) from its second to its first position actuates the rotation of the second lever (4) from its deployed position to its rest position.

13 Claims, 5 Drawing Sheets

(56) References Cited

U.S. PATENT DOCUMENTS

Figure 1:
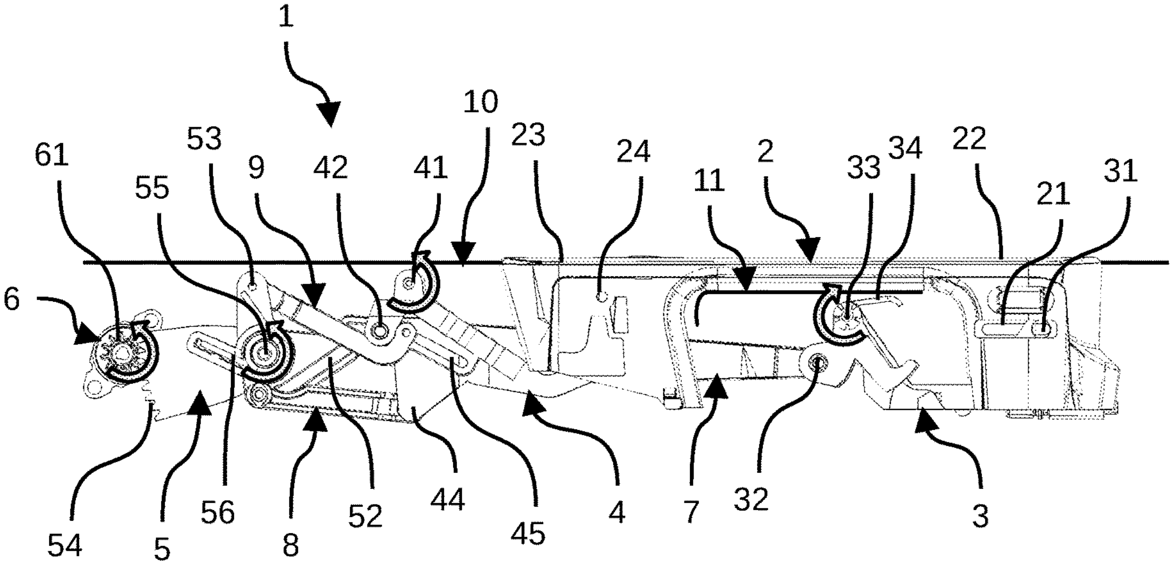

| | | | | |
|---|---|---|---|---|
| 10,487,547 | B2 * | 11/2019 | Malvy | E05B 81/06 |
| 10,815,702 | B2 * | 10/2020 | Yoshino | E05B 85/103 |
| 2005/0280266 | A1 * | 12/2005 | Mueller | E05B 77/42<br>292/336.3 |
| 2022/0018168 | A1 * | 1/2022 | Cervone | E05B 85/16 |

* cited by examiner

VEHICLE DOOR HANDLE ASSEMBLY

TECHNICAL FIELD

The present invention relates to a vehicle door assembly, in particular of the type with a handle translating from a rest position where the handle is retracted and a deployed position where the handle is deployed and can be taken in hand and opened.

BACKGROUND

Such vehicle door handle assemblies with a handle translating between a rest position and a deployed position is becoming more common and requested by manufacturers.

In order to translate between these two positions, such vehicle door handle assemblies are motorized by an electric actuator. Such electric vehicle door handle assemblies are expensive and are not suitable for entry-level vehicles due to their costs. Furthermore, these vehicle door handle assemblies may be blocked or unusable in case of electrical power supply failure.

One aim of the present invention is to find an economic and mechanical alternative for vehicle door handle assemblies having a translative movement.

To this end, the invention relates to a vehicle door handle assembly comprising a bracket and a handle, said handle comprising a first extremity and a second extremity opposed to the first extremity,

- the first extremity being connected to a first lever, said first lever being designed to be connected to an opening lever to open a latch of the vehicle door, said first lever being designed to rotate between a rest position where the first extremity of the handle is in a rest position, a deployed position where the first extremity of the handle is in a deployed position outside the bracket and an opening position where the first lever actuates the opening lever,
- the second extremity being connected to a second lever, said second lever being designed to rotate between a rest position where the second extremity of the handle is a rest position, an activation position where the second extremity of the handle is pushed into the bracket, and a deployed position where the second extremity of the handle is in a deployed position outside the bracket,
- the vehicle door handle assembly also comprising a return lever having a first extremity connected to the second lever, said return lever being designed to rotate between a first position and a second position, the return lever comprising an elastic mean passively bringing back said return lever to its first position,
- the rotation of the second lever to its activation position actuates the rotation of the return lever from its first to its second position, and the passive rotation of the return lever from its second to its first position actuates the rotation of the second lever from its deployed position to its rest position.

The return lever may be connected to a delay element which slows down the passive rotation of the return lever from its second to its first position.

The delay element may comprise at least one damper.

The at least one damper may comprise a gearwheel and the extremity of the return lever connected to the at least one damper may comprise an arc portion with teeth engaged with said gearwheel.

The extremity of the return lever connected to the at least one damper may comprise a portion without teeth in order to disconnect the return lever of the at least one damper before the said return lever reaches its first position.

The first lever may comprise an elastic mean passively bringing back said first lever from its deployed position to its rest position.

The second lever may comprise an elastic mean passively rotating said second lever toward its deployed position.

The connection between the first lever and the first extremity of the handle may be a pivot-slide connection.

The first and second levers may be connected together with at least one first rod, said first rod transmitting the rotation of the second lever from its activation position to its deployed position to the first lever, rotating said first lever from its rest position to its deployed position.

The first rod may comprise a pivot-slide connection with anyone of the first or second lever so that the first lever can rotate from its rest position to its deployed position or from its deployed position to its opening position without rotating the second lever.

The second and the return levers may be connected together by a second and a third rods,

- said second rod transmitting the rotation of the second lever from its rest position to its activation position to the return lever, rotating said return lever from its first position to its second position,
- said third rod transmitting the rotation of the return lever from its second position to its first position to the second lever, rotating said second lever from its deployed position to its rest position.

The second rod may comprise a pivot-slide connection with anyone of the second or return lever.

The third rod comprises a pivot-slide connection with anyone of the second or return lever.

Figure 2:
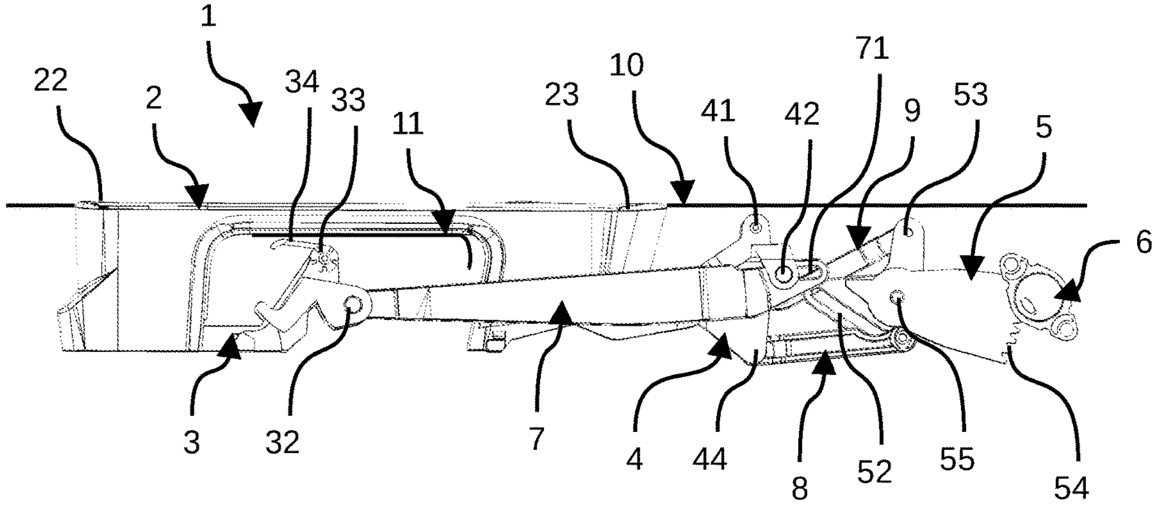
Figure 3:
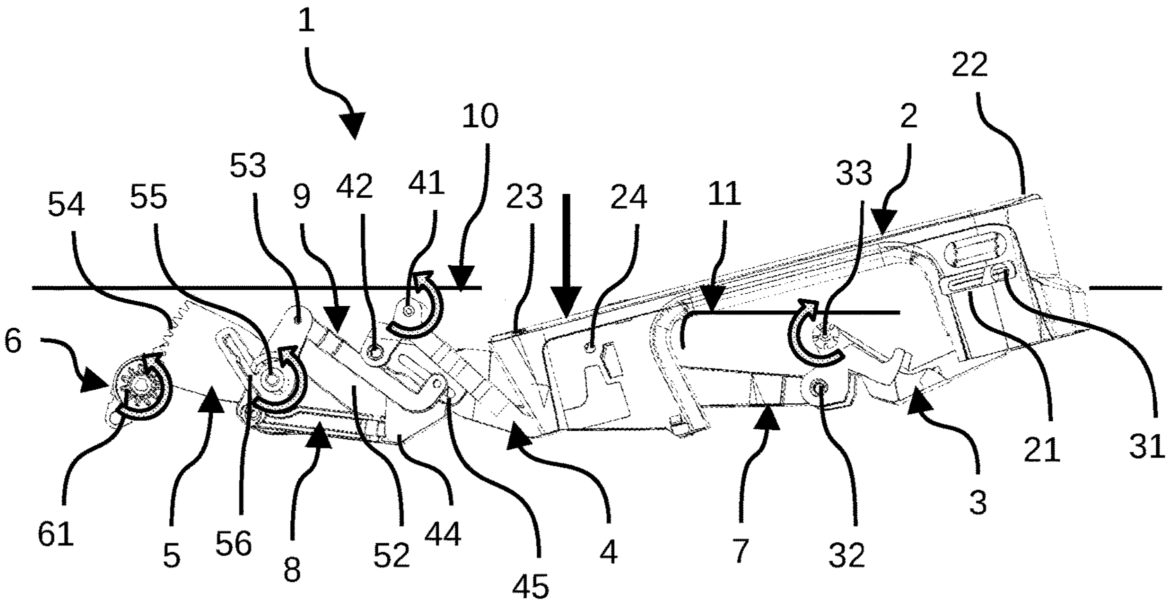
Figure 4:
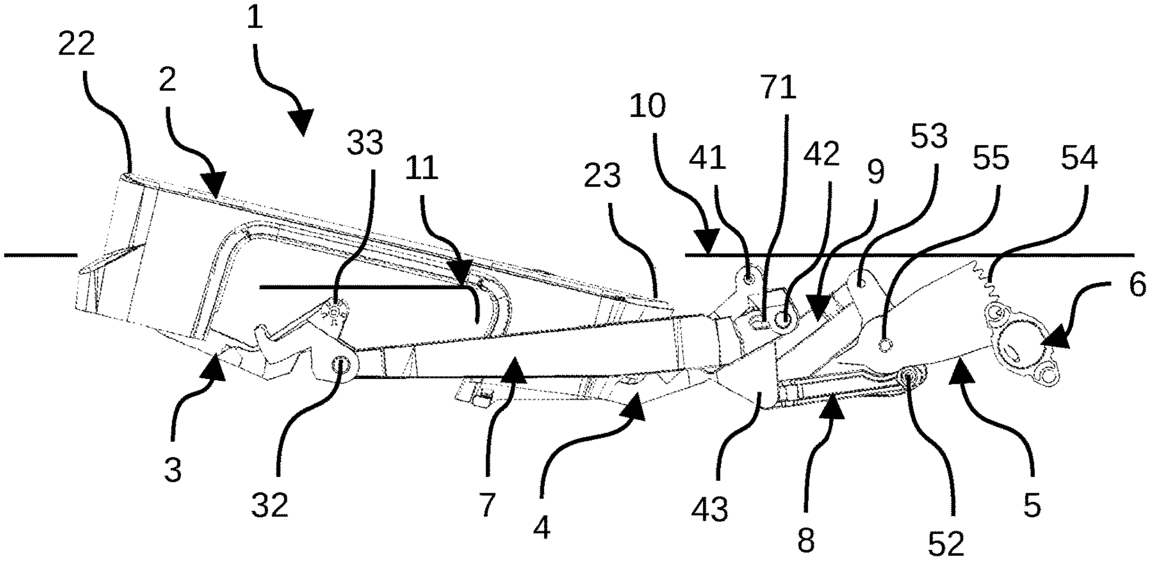
Figure 5:
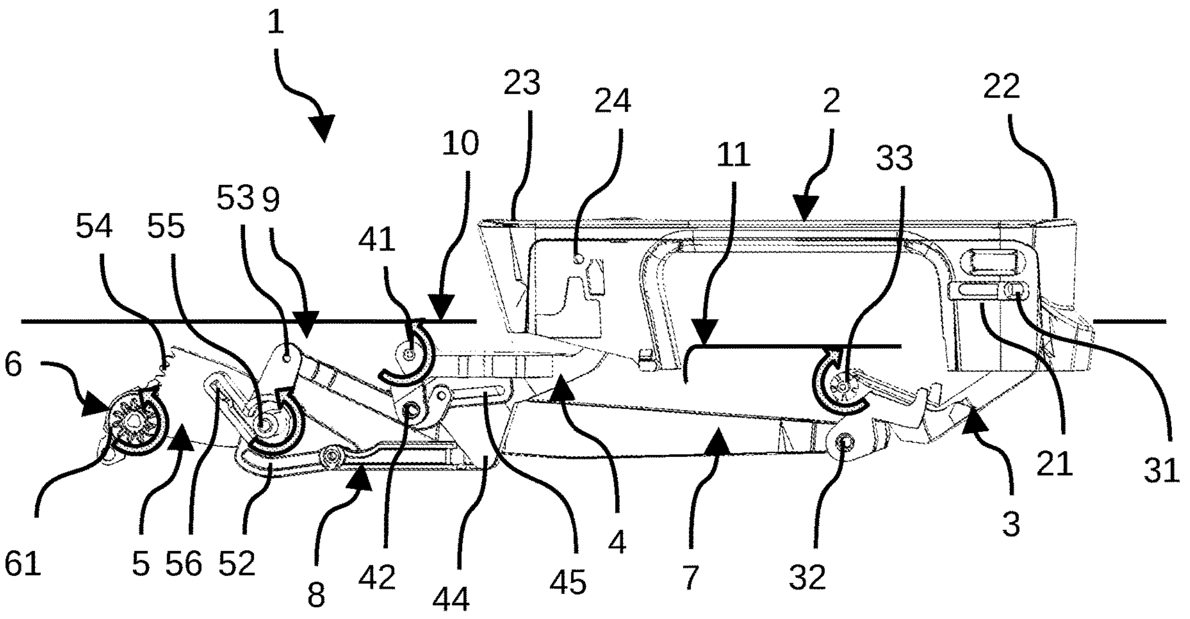
Figure 6:
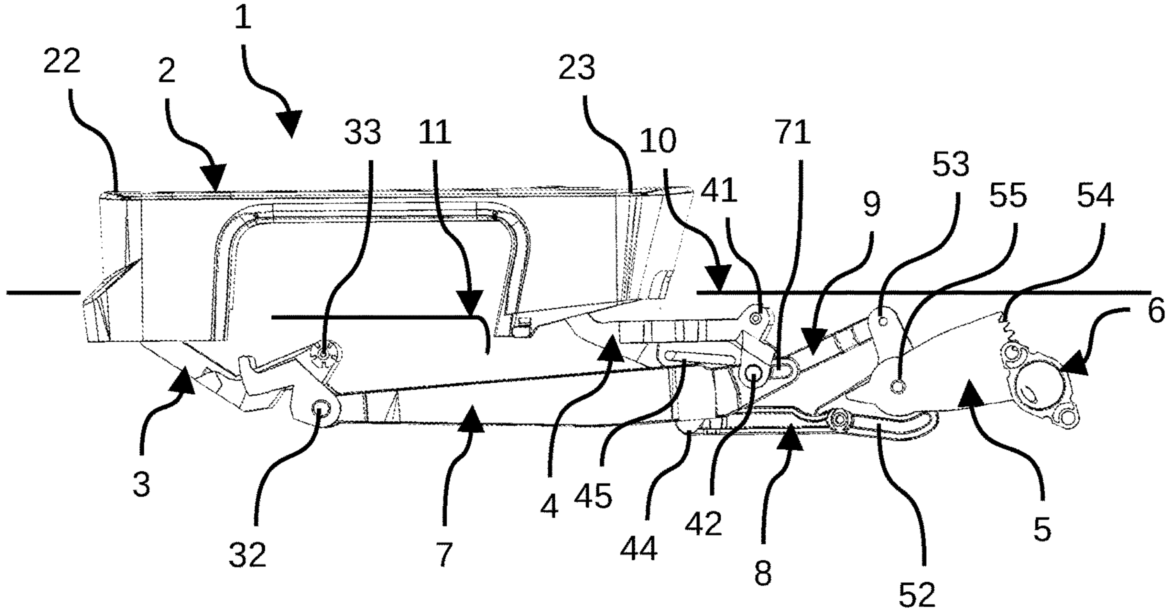
Figure 7:
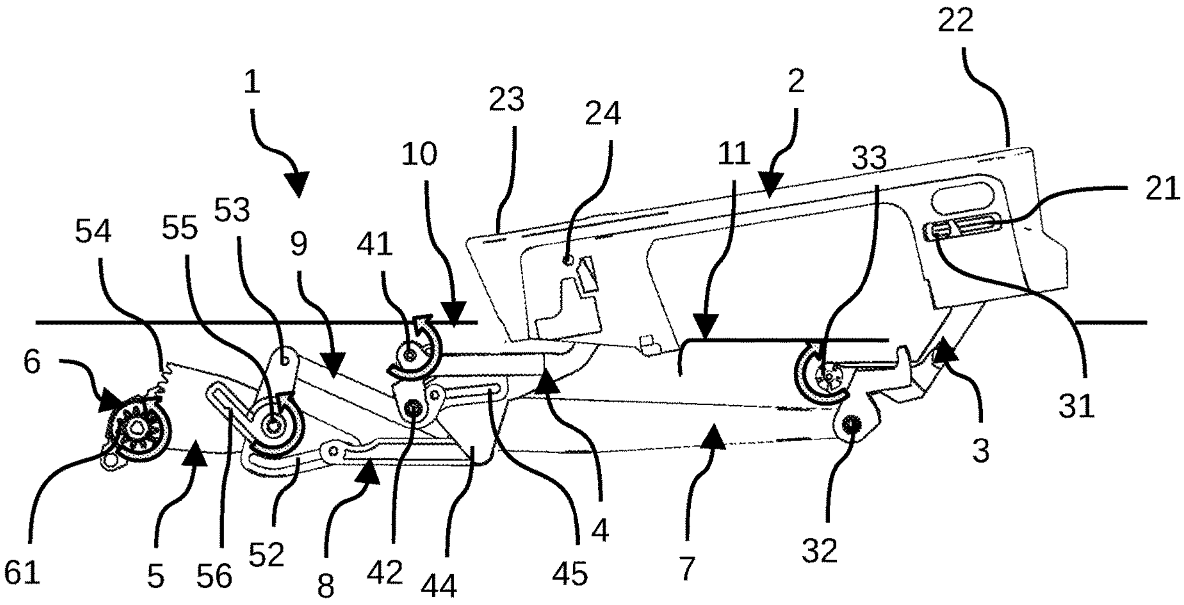
Figure 8:
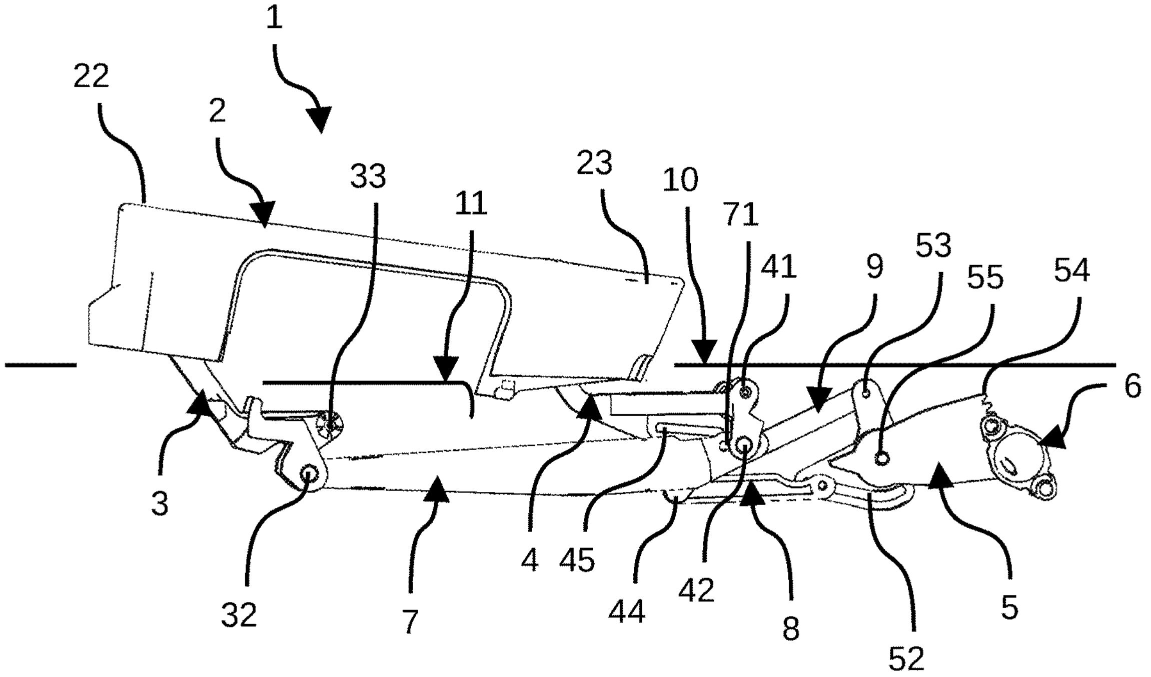
Figure 9:
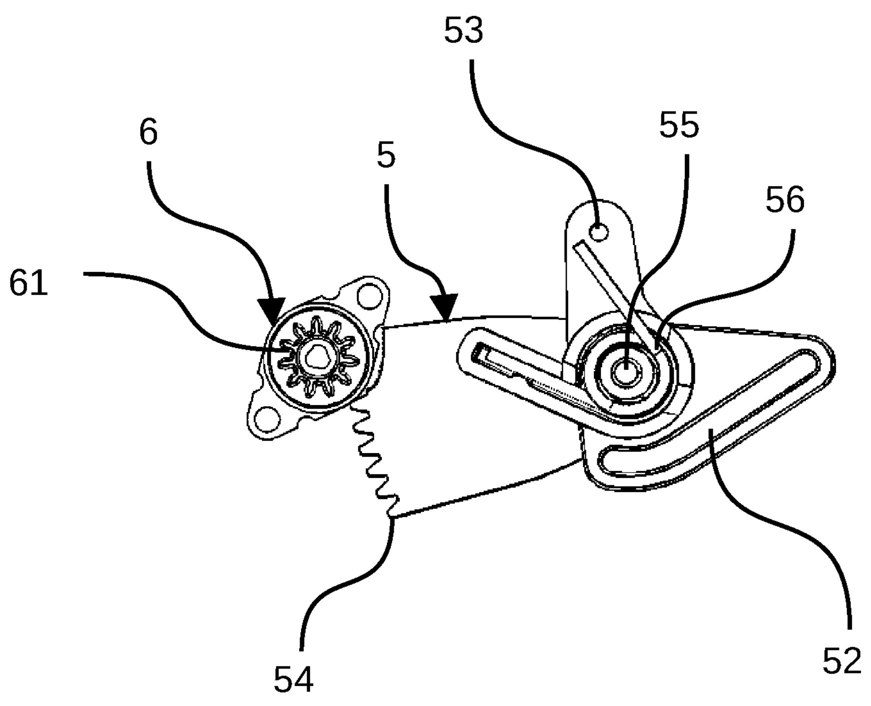

Further features and advantages of the invention will become apparent from the following description, given by way of non-limiting example, with reference to the appended drawings, in which:

FIG. 1 is a top view of a schematic representation of a first side of a vehicle door assembly in a rest position, FIG. 2 is a bottom view of a schematic representation of a second side of a vehicle door assembly in a rest position, FIG. 3 is a top view of a schematic representation of a first side of a vehicle door assembly in an activation position, FIG. 4 is a bottom view of a schematic representation of a second side of a vehicle door assembly in an activation position, FIG. 5 is a top view of a schematic representation of a first side of a vehicle door assembly in a deployed position, FIG. 6 is a bottom view of a schematic representation of a second side of a vehicle door assembly in a deployed position, FIG. 7 is a top view of a schematic representation of a first side of a vehicle door assembly in an opening position, FIG. 8 is a bottom view of a schematic representation of a second side of a vehicle door assembly in an opening position, FIG. 9 is a schematic representation of a second lever according to a particular embodiment.

In these figures, identical elements bear the same reference numbers. The following implementations are examples. Although the description refers to one or more embodiments, this does not necessarily mean that each reference relates to the same embodiment or that the features apply only to a single embodiment. Individual features of different embodiments can also be combined or interchanged to provide other embodiments.

SUMMARY OF INVENTION

FIGS. 1 and 2 show a vehicle door handle assembly 1 in a rest position. The vehicle door handle assembly 1 comprises a bracket 10 and a handle 2. The bracket 10 is designed to be fixed on the vehicle door (not represented). In this rest position, the handle 2 is retracted into the bracket 10 in order to be at the same level of the door body when installed.

The handle 2 comprises a first extremity 22 and a second extremity 23 opposed to the first extremity 22. The first extremity 22 of the handle 2 is connected to a first lever 3 and the second extremity 23 of the handle 2 is connected to a second lever 4.

The first lever 3 is also designed to be connected to an opening lever (not represented) to open a latch of the vehicle door. The first lever 3 is designed to rotate between a rest position (represented in FIGS. 1 and 2) where the first extremity 22 of the handle 2 is in a rest position, a deployed position (represented in FIGS. 3 to 6) where the first extremity 22 of the handle 2 is in a deployed position outside the bracket 10 and an opening position (represented on FIGS. 7 and 8) where the first lever 3 actuates the opening lever.

More precisely, the first lever 3 comprises a pivot connection 33 with the bracket 10 around which the first lever 3 rotates between its different positions. A first extremity of the first lever 3 is connected to the first extremity 22 of the handle 2 and a second extremity of the first lever 3, is connected to the opening lever, in particular, thanks to a pivot connection 31 and the shape of the first lever 3, the first lever 3 can touch the opening lever during the movement.

The connection between the first lever 3 and the first extremity 22 of the handle is preferably a pivot-slide connection. In the examples represented FIGS. 1, 3, 5, and 7, the first extremity 22 of the handle 2 comprises a slide opening 21 and the first lever 3 comprises a recess 31 for example to receive a pin (not represented). The first lever 3 may also comprises an elastic mean 34 passively bringing back said first lever 3 from its deployed position to its rest position. This elastic mean 34 may be a spring positioned for example on the pivot connection 33 between the first lever 3 and the bracket 10. The torque applied by this elastic mean 34 is represented by a grey arrow in FIGS. 1 to 8.

The second extremity 23 of the handle 2 is connected to a second lever 4. The second lever 4 is designed to rotate between a rest position (represented in FIGS. 1 and 2) where the second extremity 23 of the handle 2 is in a rest position, an activation position (represented in FIGS. 3 and 4) where the second extremity 23 of the handle 2 is pushed into the bracket 10, and a deployed position (represented in FIGS. 5 to 8) where the second extremity 23 of the handle 2 is in a deployed position outside the bracket 10.

More precisely, the second lever 4 comprises a pivot connection 41 with the bracket 10 around which the second lever 4 rotates between its different positions. A first extremity of the second lever 4 is connected to the second extremity 23 of the handle 2. This connection is preferably a pivot connection 24. The second lever 4 may also comprises an elastic mean (not represented) passively rotating said second lever 4 to its deployed position. This elastic mean may be a spring positioned for example on the pivot connection 41 between the second lever 4 and the bracket 10. The torque applied by this elastic mean is represented by a grey arrow in FIGS. 1 to 8.

The first 3 and second 4 levers may be connected together with at least one first rod 7 in order to synchronize the movements of the two levers 3, 4. More exactly, the first rod 7 transmits the rotation of the second lever 4 from its activation position to its deployed position to the first lever 3, rotating said first lever 3 from its rest position to its deployed position. The first rod 7 may comprises a pivot-slide connection with anyone of the first 3 or second lever 4 so that the first lever 3 can rotate from its rest position to its deployed position or from its deployed position to its opening position without rotating the second lever 4. In the example illustrated in FIGS. 1 to 8, the first rod 7 comprises a first extremity connected to a second extremity of the first lever 3 by a pivot connection 32. The first rod 7 comprises a second extremity connected to the second lever 4 by pivot-slide connection. The second extremity of the first rod 7 comprises a slide 71 and the second extremity of the second lever 4 comprises a pin 42 inserted into said slide 71. The handle 2, the first lever 3, the second 4 lever and the first rod 7 are designed and connected like a parallelogram and move together synchronously. The other connection of the first rod 7 with anyone of the first 3 or second lever 4 is preferably a pivot connection.

The vehicle door handle assembly 1 also comprises a return lever 5 having a first extremity connected to a second extremity of the second lever 4, said return lever 5 being designed to rotate between a first position (represented in FIGS. 1 and 2) and a second position (represented in FIGS. 3 to 8). More precisely, the return lever 5 comprises a pivot connection 55 with the bracket 10 around which the return lever 5 rotates between its different positions. The return lever 5 also comprises an elastic mean 56 passively bringing back said return lever 5 to its first position. This elastic mean 56 may be a spring positioned for example on the pivot connection 55 between the return lever 5 and the bracket 10. The torque applied by this elastic mean 56 is represented by a grey arrow on FIGS. 1 to 8.

The rotation of the second lever 4 to its activation position actuates the rotation of the return lever 5 from its first to its second position. The passive rotation of the return lever 5 from its second to its first position actuates the rotation of the second lever 4 from its deployed position to its rest position.

The second 4 and the return 5 levers are connected together by a second 8 and a third 9 rods. The second rod 8 transmits the rotation of the second lever 4 from its rest position to its activation position to the return lever 5, rotating said return lever 5 from its first position to its second position. The third rod 9 transmits the rotation of the return lever 5 from its second position to its first position to the second lever 4, rotating said second lever 4 from its deployed position to its rest position. The second 8 and the third 9 rods are placed on the return lever 5 on either side of the pivot connection 55 of the return lever 5 with the bracket 10. The second 8 and the third 9 rods are placed on the second extremity of second lever 5 on the same side of the pivot connection 41 of the second lever 4 with the bracket 10.

The second rod 8 may comprises a pivot-slide connection 52 with anyone of the second lever 4 or return lever 5. In the example illustrated in FIGS. 1 to 8, the pivot-slide connection 52 is placed between the return lever 5 and the second rod 8. The return lever 5 comprises the slide of said pivot-slide connection 52 and the second rod 8 comprises a pin inserted in the slide. Still according to the example illustrated in FIGS. 1 to 8, the connection between the second rod 8 and the second lever 4 is a pivot connection 44. The other connection of the second rod 8 with any of the second lever 4 or return lever 5 is preferably a pivot connection.

The third rod 9 may comprises a pivot-slide connection 45 with any of the second lever 4 or return lever 5. In the example illustrated in FIGS. 1 to 8, the pivot-slide connection 45 is placed between the second lever 4 and the third rod 9. The second lever 4 comprises the slide of said pivot-slide connection 45 and the third rod 9 comprises a pin inserted in the slide. Still according to the example illustrated in FIGS. 1 to 8, the connection between the third rod 9 and the return lever 5 is a pivot connection 53. The other connection of the third rod 9 with any of the second lever 4 or return lever 5 is preferably a pivot connection.

The return lever 5, more exactly its second extremity, is connected to a delay element 6 which slows down the passive rotation of the return lever 5 from its second to its first position. This delay element 6 may comprises at least one damper as illustrated in FIGS. 1 to 8. The at least one damper 6 may comprises a gearwheel 61 and the extremity of the return lever 5, connected to the at least one damper 6, comprises an arc portion with teeth 54 engaged with said gearwheel 61. The torque applied by this at least one damper 6 is represented by a grey arrow on FIGS. 1 to 8.

The FIGS. 1 to 8 represent different positions and cinematic steps of the deployment, opening and retractation of the handle 2.

As described above, FIGS. 1 and 2 are a representation of a rest position where the handle 2 is retracted into the bracket 10 in order to be at the same level of the door body when installed. The first lever 3 is in its rest position and maintained in this rest position by the elastic mean 34. The second lever 4 is in its rest position and the return lever 5 is in its first position. The return lever 5 is maintained in its first position by the elastic mean 56. The elastic mean 56 of the return lever 5 is stronger than the elastic mean of the second lever 4 in order that the return lever 5 in its first position maintained the second lever 4 in its rest position. The elastic mean 56 of the return lever 5 is also stronger than the delay element 6 in order to maintain the return lever 5 in its first position. In this rest position, the inside of the handle 2 may also rests on a rest portion 11 of the bracket 10 placed between the first 22 and second 23 extremities of the handle 2.

FIGS. 3 and 4 represent an activation position of the handle 2 where the user activates the handle 2 by pushing the second extremity 23 of the handle 2 into the bracket 10. Due to this push, the handle 2 rotates taking support on the rest portion 11 of the bracket 10. The first extremity 22 of the handle 2 protrudes from the bracket 10 and rotates the first lever 3 around its pivot connection 33 with the bracket 10 from its rest position to an intermediate. The rotation of the first lever 3 is not transmitted to the second lever 4 by the first rod 7 due to the pivot-slide connection of the first rod 7 with anyone of the first 3 or second lever 4.

The push of the second extremity 23 of the handle 2 rotates the second lever 4 around its pivot connection 41 with the bracket 10 from its rest position to its activation position. The rotation of the second lever 4 causes the rotation of the return lever 5 around its pivot connection 55 with the bracket 10 from its first to its second position. In the example illustrated in FIGS. 3 and 4, the transmission of the rotation of the second lever 4 to the return lever 5 is made by the second rod 8 which pushes one side of the return lever 5 causing its rotation. Indeed, the rotation of the second lever 4 to its activation position makes the second rod 8 slid in its slide-pivot connection with anyone of the second 4 or return lever 5 bringing the second rod 8 to abutment pushing the return lever 5. The third rod 9 slides in its slide-pivot connection with anyone of the second lever 4 or return lever 5 without affecting the rotation of anyone of these levers 4, 5. The rotation of the second lever 4 is made against the torque of its elastic mean and the rotation of the return lever 5 is made against the torque of its elastic mean 56.

FIGS. 5 and 6 represent a deployed position of the handle 2 where the first lever 3 is still in its deployed position and where the second lever 4 has rotated from its activation position to its deployed position, bringing the second extremity 23 of the handle 2 in its deployed position outside the bracket 10. When the user removes his push on the second extremity 23 of the handle 2, the elastic mean of the second lever 4 allows the passive rotation of the second lever 4 to its deployed position. The rotation of the second lever 4 is not transmitted to the return lever 5 by any of the second 8 or third rod 9 which slide with their pivot-slide connections. The first lever 3 is maintained in its deployed position due to the first rod 7 which is in abutment with its pivot-slide connection. The return lever 5 is still on its second position due to the delay element 6. The third rod 9 is in abutment in order to stop the rotation of the second lever 4 in its deployed position against the torque of its elastic mean 34.

FIGS. 7 and 8 represent an opening position of the handle where the user can grab the handle and pull it or has taken the handle and pulled it in order to open the vehicle door. When the user pulls the handle 2, it rotates around the pivot connection 24 between the second extremity 23 of the handle 2 and the second lever 4. The first extremity 22 of the handle 2 is pulled in an opening position rotating the first lever 3 from its deployed position to its opening position. The rotation of the first lever 3 is not transmitted to the second lever 4 by the first rod 7 due to its pivot-slide connection. When the user releases the handle 2, the first lever 3 rotates back to its deployed position due to its elastic mean 34.

The delay element 6 slows down the passive return rotation of the return lever 5 from its second position to its first position. When the return lever 5 rotates from its second to its first position, it also transmits its rotation to the second lever 4 in order to rotate the second lever 4 from its deployed position to its rest position. In the example illustrated in FIGS. 7 and 8, when the return lever 5 rotates to its first position, the third rod 9 is in abutment in order to pull back the second lever 4 in its rest position against the torque of the elastic mean of the second lever 4. The rotation of the second 4 and the first 3 levers to their rest position are synchronous due to the first rod 7. Thus, the handle 2 translates from its deployed position (FIGS. 5 and 6) to its rest position (FIGS. 1 and 2). This translation is slowed down and progressive thanks to the delay element 6.

In a particular embodiment illustrated in FIG. 9, the extremity of the return lever 5 connected to the at least one damper 6 may comprises a portion without teeth 54 in order to disconnect the return lever 5 of the at least one damper 6 before said return lever 5 reaches its first position. This embodiment allows accelerating the return of the return lever 5 at the end and so accelerating the translation of the handle 2 from its deployed position to its rest position when the handle 2 is near its rest position.

LIST OF REFERENCES

1: vehicle door handle
10: bracket

11: rest bracket
2: handle
21: slide of the first extremity of the handle
22: first extremity of the handle
23: second extremity of the handle
24: second extremity pivot connection
3: first lever
31: recess at the first extremity of the first lever
32: pivot connection of the first lever with first rod
33: pivot connection of the first lever with bracket
34: elastic mean
4: second lever
41: pivot connection of the second lever with the bracket
42: pivot connection of the second lever with first rod
44: pivot connection of the of the second lever with the second rod
45: slide-pivot connection of the second lever with the third rod
5: return lever
52: slide-pivot connection of the return lever with the second rod
53: pivot connection of the return lever with the third rod
54: teeth of the return lever
55: pivot connection of the return lever with the bracket
56: elastic mean
6: damper
61: gear
62: fixing mean
7: first rod
71: extremity slide of the first rod
8: second rod
9: third rod

The invention claimed is:

1. A vehicle door handle assembly comprising:

a bracket;

a handle, said handle including a first extremity and a second extremity opposed to the first extremity, the first extremity being connected to a first lever, said first lever being designed to be connected to an opening lever to open a latch of a vehicle door, said first lever being designed to rotate between a rest position where the first extremity of the handle is in a rest position, a deployed position where the first extremity of the handle is in a deployed position outside the bracket and an opening position where the first lever actuates the opening lever, and the second extremity being connected to a second lever, said second lever being designed to rotate between a rest position where the second extremity of the handle is a rest position, an activation position where the second extremity of the handle is pushed into the bracket, and a deployed position where the second extremity of the handle is in a deployed position outside the bracket; and a return lever having a first extremity connected to the second lever, said return lever being designed to rotate between a first position and a second position, the return lever including an elastic means passively bringing back said return lever to its first position, wherein the rotation of the second lever to its activation position actuates the rotation of the return lever from its first to its second position, and the passive rotation of the return lever from its second to its first position actuates the rotation of the second lever from its deployed position to its rest position.

2. The vehicle door handle assembly according to claim 1, wherein the return lever is connected to a delay element which slows down the passive rotation of the return lever from its second to its first position.

3. The vehicle door handle assembly according to claim 2, wherein the delay element comprises at least one damper.

4. The vehicle door handle assembly according to claim 3, wherein the at least one damper comprises a gearwheel and wherein the extremity of the return lever connected to the at least one damper comprises an arc portion with teeth engaged with said gearwheel.

5. The vehicle door handle assembly according to claim 4, wherein the extremity of the return lever connected to the at least one damper comprises a portion without teeth in order to disconnect the return lever of the at least one damper before the said return lever reaches its first position.

6. The vehicle door handle assembly according to claim 1, wherein the first lever comprises an elastic means passively bringing back said first lever from its deployed position to its rest position.

7. The vehicle door handle assembly according to claim 1, wherein the second lever comprises an elastic means passively rotating said second lever toward its deployed position.

8. The vehicle door handle assembly according to claim 1, wherein the connection between the first lever and the first extremity of the handle is a pivot-slide connection.

9. The vehicle door handle assembly according to claim 1, wherein the first and second levers are connected together with at least one first rod, said first rod transmitting the rotation of the second lever from its activation position to its deployed position to the first lever, rotating said first lever from its rest position to its deployed position.

10. The vehicle door handle assembly according to claim 9, wherein the first rod comprises a pivot-slide connection with anyone of the first or second lever so that the first lever can rotate from its rest position to its deployed position or from its deployed position to its opening position without rotating the second lever.

11. The vehicle door handle assembly according to claim 1, wherein the second and the return levers are connected together by a second and a third rods, said second rod transmitting the rotation of the second lever from its rest position to its activation position to the return lever, rotating said return lever from its first position to its second position, said third rod transmitting the rotation of the return lever from its second position to its first position to the second lever, rotating said second lever from its deployed position to its rest position.

12. The vehicle door handle assembly according to claim 11, wherein the second rod comprises a pivot-slide connection with anyone of the second or return lever.

13. The vehicle door handle assembly according to claim 11, wherein the third rod comprises a pivot-slide connection with anyone of the second or return lever.

* * * * *